(No Model.)
E. SOLVAY.
PROCESS OF DISTILLING HYDROCHLORIC ACID.
No. 453,986. Patented June 9, 1891.
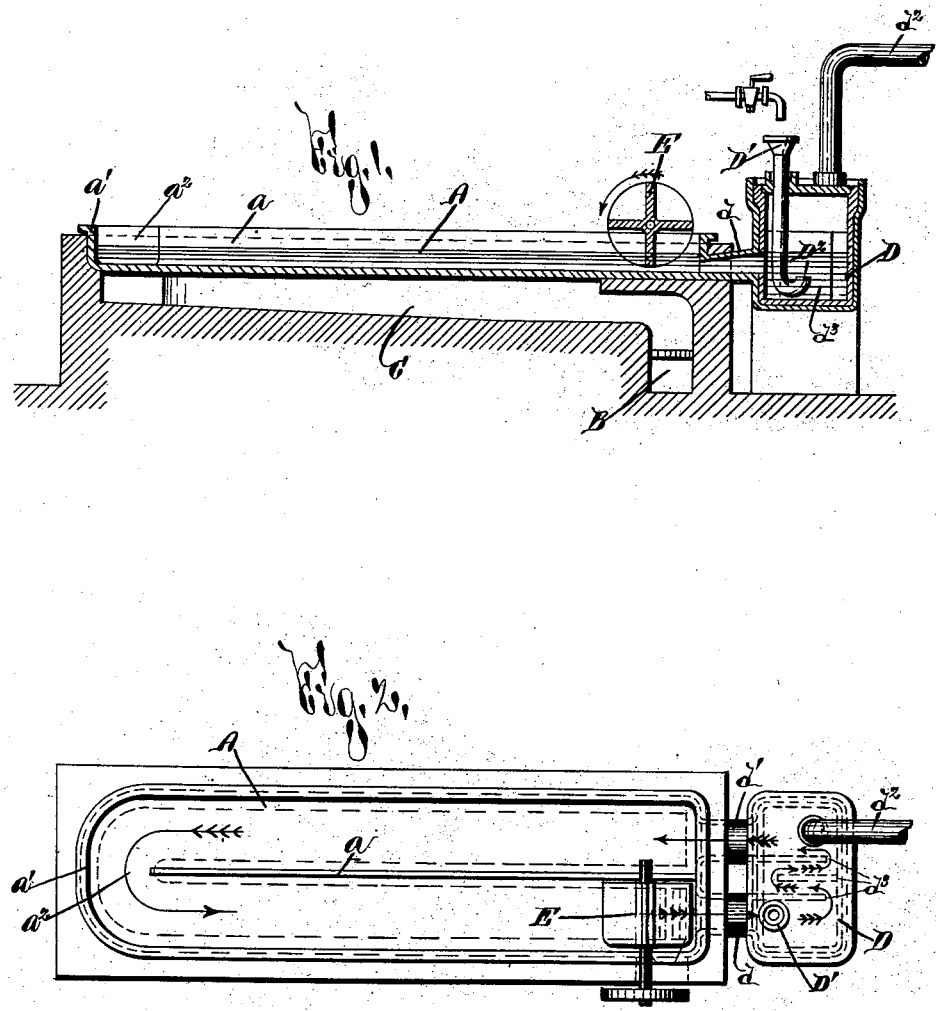
WITNESSES:
INVENTOR
Ernest Solvay
BY
ATTORNEYS

UNITED STATES PATENT OFFICE.

ERNEST SOLVAY, OF BRUSSELS, BELGIUM, ASSIGNOR TO THE SOLVAY PROCESS COMPANY, OF SYRACUSE, NEW YORK.

PROCESS OF DISTILLING HYDROCHLORIC ACID.

SPECIFICATION forming part of Letters Patent No. 453,986, dated June 9, 1891.

Application filed April 17, 1890. Serial No. 348,293. (No specimens.) Patented in Belgium September 17, 1889, No. 87,749; in England October 3, 1889, No. 15,531, and in France December 17, 1889, No. 202,662.

*To all whom it may concern:*

Be it known that I, ERNEST SOLVAY, a citizen of Belgium, residing at Brussels, Belgium, have invented a new and useful Improvement in the Distillation of Hydrochloric Acid, (patented in Belgium, No. 87,749, dated September 17, 1889; in France, No. 202,662, dated December 17, 1889, and in Great Britain, No. 15,531, dated October 3, 1889,) of which the following is a specification.

My invention relates to an improved process for distilling hydrochloric acid; and to this end it consists, essentially, in feeding hydrochloric acid within a distilling-receptacle, subjecting the same to a circuit of dehydrating material, whereby hydrochloric-acid gas is liberated and the dehydrating material diluted, withdrawing said dehydrating material from the distiller into an evaporating receptacle for concentrating the same, and in forcing the concentrated dehydrating material to re-enter the distilling receptacle and liberate the hydrochloric-acid gas from the incoming hydrochloric acid.

The invention also consists in condensing the liberated hydrochloric-acid gas in pure water, all as hereinafter more fully described, and pointed out in the claims.

In describing my invention reference is had to the accompanying drawings, forming a part thereof, in which like letters indicate corresponding parts in all the views.

Figure 1 represents a longitudinal vertical section of my improved apparatus, and Fig. 2 represents a top plan view of the parts as illustrated in Fig. 1.

In the chemical industry it is sometimes necessary to separate hydrochloric acid in the dry and gaseous condition from its commercial solution. It has long been known that distillation pure and simple is not suitable for this purpose and that it is necessary to employ dehydrating material, and sulphuric acid or chloride of calcium have been used for this purpose.

The apparatus designed for the distillation of hydrochloric acid is very disagreeable to manage, since after the exit of the hydrochloric-acid gas it is necessary to conduct the sulphuric acid or chloride of calcium into an evaporating apparatus for the purpose of concentrating the dehydrating material which becomes diluted in the distillation of the hydrochloric-acid gas. It is only possible to slightly concentrate the dilute dehydrating material, as the remaining chlorides in the evaporating apparatus would cause great embarrassment if too great a degree of concentration were effected, and it is therefore necessary to handle considerable quantities of the dehydrating material, which from their nature and temperature are not easily handled.

The object of my present invention is to effect the continuous distillation of the hydrochloric acid with a minimum degree of expense required for heat and a minimum inconvenience in handling, and it is immaterial in carrying out my process whether sulphuric acid, calcium chloride, or other dehydrating material be used, with the exception that when sulphuric acid is used the apparatus must be either formed or lined with lead.

A represents an evaporating-receptacle, (here shown as composed of an open oblong chamber and formed into two compartments by a partition $a$,) which, in order to establish a connection $a^2$ between the two compartments, does not extend to the end $a'$ of the evaporating-chamber.

A heat-generator B of suitable kind, form, or size is operated to produce heat, which by means of suitably-constructed flues C or other means is utilized to heat the receptacle A, and thus concentrate the dehydrating material within the same.

D represents a distilling apparatus, connected by the inlet-pipe $d$ and the outlet-pipe $d'$ to the separate compartments of the evaporating-chamber, whereby the dehydrating material is conducted from the evaporating to the distilling chamber, and is thence returned to the evaporating-chamber for concentration. This chamber D is closed and provided with a suitable outlet-pipe $d^2$ for conducting the liberated hydrochloric-acid gas to any desired locality.

The entire apparatus is filled with sulphuric acid, or with a concentrated solution of calcium chloride, and when brought to a sufficient temperature a continuous stream of liquid hydrochloric acid is introduced within the distilling-receptacle by means of the inlet-pipe D'. This inlet-pipe may be of any suitable construction, but is preferably so formed that its lower inlet extremity $D^2$ is near the base of said distilling-receptacle and below the top level of the dehydrating material. Immediately upon the entrance of the hydrochloric acid the dehydrating material liberates hydrochloric-acid gas and becomes thereby diluted. In order to effect this operation of my process, I force the dehydrating material in a continuous circuit and preferably by a paddle or propeller E revolving within the evaporating-receptacle and effect a continuous movement of the dehydrating material therein, thus withdrawing the dilute material from the distilling-receptacle, passing the same through the evaporating-receptacle and raising its degree of concentration, and then forcing the same into the distilling apparatus for liberating the hydrochloric-acid gas. The flow of this dehydrating material in the carrying out of my invention is shown by arrows upon Fig. 2, and it will be understood that the best result is obtained by effecting but a slow movement thereof in order to concentrate the same as desired, and also bring about the desired distillation.

In order to avoid too quick mixing in the distiller and to prevent loss of acid or the calcium chloride, I introduce several baffle-plates $d^3$ in the distilling-receptacle for compelling the dehydrating material and hydrochloric acid to flow therethrough in a winding circuit. This result is further obtained by admitting the hydrochloric acid into the distilling-apparatus at substantially the same point as the dehydrating material, and by withdrawing the gas from an opposite portion of said distilling-receptacle.

In some cases it is desirable that air be present at the distillation, and in this case I frequently prefer to use the same as an injector, which at the same time produces the current of dehydrating-liquid.

It will be understood that my process is not limited to any particular form of apparatus, that, if desired, separate compartments may be used instead of a subdivided single compartment, and that other propelling means may be used for effecting the continuous circuit of the dehydrating material. It will thus be understood that by my process I entirely obviate the pumping of heated liquid and acid by distilling the acid in a horizontal apparatus, and that a minimum amount of fuel is required, and that the excess of the dehydrating material may be as large as desired without increasing the labor. The liberated hydrochloric-acid gas is conducted by the pipe $d^2$ to a suitable condensing apparatus, and is there condensed with pure water, thus producing a chemically-pure product. It will also be understood that my invention is not limited to any particular form of apparatus.

Having thus fully described my invention, what I claim as new, and desire to secure by Letters Patent, is—

1. The herein-described process of distilling hydrochloric acid, the same consisting in passing a dehydrating material in a continuous circuit, subjecting said circuit of dehydrating material to heat for concentrating the same, and subjecting a solution of hydrochloric acid to the action of said circuit of dehydrating material after its concentration, and thereby liberating hydrochloric-acid gas, substantially as set forth.

2. The herein-described process of distilling hydrochloric acid, the same consisting in passing a dehydrating material in a continuous circuit, subjecting said circuit of dehydrating material to heat for concentrating the same, subjecting a solution of hydrochloric acid to the action of said circuit of dehydrating material after its concentration, and thereby liberating hydrochloric-acid gas and condensing the said acid in pure water, substantially as set forth.

3. The herein-described process of distilling hydrochloric acid, the same consisting in feeding hydrochloric acid into the base of a current of dehydrating material and liberating hydrochloric-acid gas, withdrawing said gas from above said current, withdrawing the dilute dehydrating material, subjecting the said dilute dehydrating material to heat for concentrating the same, and forcing the concentrated dehydrated material to the undistilled hydrochloric acid, substantially as described.

In testimony whereof I have hereunto signed my name, in the presence of two attesting witnesses, at the city of Brussels, Belgium, this 12th day of December, 1889.

ERNEST SOLVAY.

Witnesses:
R. LUCION,
GREGORY PHELAR.